United States Patent
Li et al.

(10) Patent No.: US 10,181,870 B2
(45) Date of Patent: Jan. 15, 2019

(54) METHOD AND DUAL BAND RADIO RECEIVER FOR HANDLING ANALOG DUAL BAND RADIO SIGNAL

(71) Applicant: Telefonaktiebolaget LM Ericsson (publ), Stockholm (SE)

(72) Inventors: Ming Li, Beijing (CN); Youping Su, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/755,629

(22) PCT Filed: Aug. 27, 2015

(86) PCT No.: PCT/CN2015/088260
§ 371 (c)(1),
(2) Date: Feb. 27, 2018

(87) PCT Pub. No.: WO2017/031754
PCT Pub. Date: Mar. 2, 2017

(65) Prior Publication Data
US 2018/0248578 A1    Aug. 30, 2018

(51) Int. Cl.
*H04B 1/00* (2006.01)
*H04B 1/06* (2006.01)
*H04B 1/16* (2006.01)
*H04B 1/18* (2006.01)

(52) U.S. Cl.
CPC ........... *H04B 1/1638* (2013.01); *H04B 1/005* (2013.01); *H04B 1/06* (2013.01); *H04B 1/1646* (2013.01); *H04B 1/18* (2013.01)

(58) Field of Classification Search
None
See application file for complete search history.

(56) References Cited

U.S. PATENT DOCUMENTS

| 6,091,765 A * | 7/2000 | Pietzold, III | H03G 3/345 455/418 |
| 6,480,528 B1 * | 11/2002 | Patel | H03G 3/3052 375/148 |

(Continued)

FOREIGN PATENT DOCUMENTS

| CN | 102684715 A | 9/2012 |
| CN | 103416005 A | 11/2013 |
| WO | 00 72456 A1 | 11/2000 |

OTHER PUBLICATIONS

PCT Notification of Transmittal of the International Search Rpeort and the Written Opinion of the International Searching Authority, or the Declaration for International application No. PCT/CN2015/088260—dated Jun. 1, 2016.

*Primary Examiner* — Lana N Le
(74) *Attorney, Agent, or Firm* — Patent Portfolio Builders, PLLC

(57) ABSTRACT

The present disclosure provides a method and a dual band receiver for handling an analog dual band radio signal comprising a first frequency band component and a second frequency band component. The method comprises sampling the analog dual band radio signal through the use of interleaving analog-to-digital converters, ADCs, to obtain four sampled signals including a first I component, Iin+, a first Q component, Qin+, a second I component, Iin−, and a second Q component, Qin−, wherein phases of Qin+, Iin− and Qin− are respectively offset with respect to phases of Iin+, Qin+ and Iin− by $\pi/2$. Then, the four sampled signals are filtered through the use of polyphase filters to obtain a first set of filtered signals (a1, a2, a3, a4) each of which has a same power as the first frequency band component and a second set of filtered signals (b1, b2, b3, b4) each of which has a same power as the second frequency band component. Subsequently, a power of the first frequency band component, a power of the second frequency band component and (Continued)

a total power of the first frequency band component and the second frequency band component are estimated, based on the four sampled signals, the first set of filtered signals and the second set of filtered signals. Next, the first frequency band component and the second frequency band component are selectively attenuated based on the estimated powers.

10 Claims, 9 Drawing Sheets

(56) References Cited

U.S. PATENT DOCUMENTS

| | | | | |
|---|---|---|---|---|
| 8,018,379 B1* | 9/2011 | Sun | ............ | G01S 19/33 |
| | | | | 342/357.73 |
| 9,954,627 B2* | 4/2018 | Hagiwara | ............ | H04B 17/21 |
| | | | | 455/334 |
| 2002/0106018 A1* | 8/2002 | D'Luna | ............ | G06T 9/007 |
| | | | | 375/240.01 |
| 2005/0075815 A1* | 4/2005 | Webster | ............ | H03C 3/406 |
| | | | | 702/106 |
| 2011/0026509 A1* | 2/2011 | Tanaka | ............ | H04B 1/713 |
| | | | | 455/334 |
| 2012/0026039 A1* | 2/2012 | Ganeshan | ............ | G01S 19/33 |
| | | | | 342/357.73 |
| 2012/0236975 A1* | 9/2012 | Yamagishi | ............ | H03G 3/3068 |
| | | | | 375/346 |
| 2017/0026205 A1* | 1/2017 | Agee | ............ | H04L 25/08 |
| | | | | 375/346 |

* cited by examiner

METHOD AND DUAL BAND RADIO RECEIVER FOR HANDLING ANALOG DUAL BAND RADIO SIGNAL

PRIORITY

This nonprovisional application is a National Stage Filing under 35 U.S.C. § 371 of International Patent Application Serial No. PCT/CN2015/088260 filed Aug. 27, 2015, and entitled "Method and Dual Band Radio Receiver for Handling Analog Dual Band Radio Signal."

TECHNICAL FIELD

The present disclosure generally relates to the technical field of wireless communications, and particularly, to a method and a dual band radio receiver for handling an analog dual band radio signal comprising a first frequency band component and a second frequency band component.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

With the advancement of digital signal processing technology and the improvement in performance of wideband radio frequency devices, dual band radio receiver has become available in today's wireless communications systems.

By way of illustration, if a base station (BS) is equipped with a dual band radio receiver, it can receive from two user equipments (UEs) simultaneously in two respective frequency bands, as shown in FIG. 1.

Typically, a dual band radio receiver may be structured as shown in FIG. 2, in order to facilitate reusing part of the receiver for processing both frequency components and hence reduce the size and cost of the receiver. As illustrated, after a dual band radio signal which consists of a first frequency band component (denoted as band 1) and a second frequency band component (denoted as band 2) is received at the antenna of the receiver, it is filtered and passes through a low noise amplifier (LNA). Then, the dual band signal is filtered by two respective radio frequency (RF) filters, each of which allows a respective one of the first and the second frequency band components to pass through. Thus, the first and the second frequency band components can be attenuated independently from each other by respective attenuators. Next, by means of frequency mixing, the two frequency band components are combined into the same intermediate frequency (IF) signal, which enters a common IF stage that comprises an IF filter and an anti-aliasing (AA) filter and possibly an attenuator therebetween. Thereafter, the output from the AA filter is converted from an analog signal into a digital signal which is subject to digital processing.

In order for the dual band radio receiver to cope with the worst case where the first frequency band component has a high power (e.g., −35 dBm) while the second frequency band component has a low power (e.g., −105 dBm), automatic gain control (AGC) function must be triggered separately for the first and the second frequency band components by measuring powers of the first and the second frequency band components and determining whether the powers of the first and the second frequency band components exceed a first AGC threshold and a second AGC threshold respectively (the first AGC threshold may or may not be equal to the second AGC threshold). Supposing both the first and the second AGC thresholds are set to −45 dBm, the AGC function would be triggered only for the first frequency band component, because the power of the first frequency band component exceeds the first AGC threshold while the power the second frequency band component does not exceed the second AGC threshold. Accordingly, a lower gain would be determined and applied only for the first frequency band component, causing a noise floor increment that does not affect the identification of the first frequency band component which has a high power level. Meanwhile, the AGC function would not be triggered for the second frequency band component, no noise floor increment would be incurred, and the identification of the second frequency band component which has a low power level would not be affected.

Otherwise, if the AGC function is triggered for both the first and the second frequency band components as long as the highest one of the powers of the first and the second frequency band components (in this example, the power of the first frequency band component) exceeds a single AGC threshold, it would be impossible to identify the power of the second frequency band component because the increased noise floor due to the triggering of the AGC function would be higher than the power of the second frequency band component, as illustrated in FIG. 3.

In the prior art, two structures have been proposed for the dual band radio receiver. As illustrated in FIG. 4, one of the prior art receiver structures is characterized by inserting a coupler in each of the respective RF branches for the first and the second frequency band components and using a first power meter, a second power meter and a third digital power meter to measure the power of the first frequency band component, the power of the second frequency band component and the total power of the first and the second frequency band components respectively. Due to the use of couplers which are analog devices, the receiver structure illustrated in FIG. 4 has the advantage of being able to react fast enough to keep pace with a rapid change of the power of the received dual band radio signal (for example, due to fast quality degradation of the wireless channel on which the dual band radio signal is received). However, it suffers from drawbacks (such as large size, high power consumption and high cost) that are intrinsic to analog devices.

Instead of using couplers and directly measuring the powers of the first and the second frequency band components, the other one of prior art receiver structures as illustrated in FIG. 5 is characterized by using numerically controlled oscillators (NCOs) and baseband filters and by measuring the powers of the first and the second frequency band components after they have undergone digital processing. Because it does not include couplers, this receiver structure can be smaller in size, less power-consuming and less costly. However, it is incompetent to track a rapid change of the power of the received dual band radio signal, since its response speed is limited by the digital processing which is time-consuming.

SUMMARY

In view of the foregoing, an object of the present disclosure is to provide a novel solution for handling an analog dual band radio signal, which ensures a response speed fast enough to track a rapid change of the analog dual band radio signal by using hardware devices which are of small volume, low power consumption, and low cost.

According to a first aspect of the present disclosure, there is provided a method in a dual band radio receiver for handling an analog dual band radio signal comprising a first frequency band component and a second frequency band component. The method comprises sampling the analog dual band radio signal through the use of interleaving analog-to-digital converters, ADCs, to obtain four sampled signals including a first I component, Iin+, a first Q component, Qin+, a second I component, Iin−, and a second Q component, Qin−. Phases of Qin+, Iin− and Qin− are respectively offset with respect to phases of Iin+, Qin+ and Iin− by π/2. Then, the four sampled signals are filtered through the use of polyphase filters to obtain a first set of filtered signals each of which has a same power as the first frequency band component and a second set of filtered signals each of which has a same power as the second frequency band component. Subsequently, a power of the first frequency band component, a power of the second frequency band component and a total power of the first frequency band component and the second frequency band component are estimated, based on the four sampled signals, the first set of filtered signals and the second set of filtered signals. Next, the first frequency band component and the second frequency band component are selectively attenuated based on the estimated powers.

According to a second aspect of the present disclosure, there is provided a dual band radio receiver for handling an analog dual band radio signal comprising a first frequency band component and a second frequency band component. The receiver comprises interleaving ADCs, polyphase filters, power estimators and an AGC. The interleaving ADCs are configured to sample the analog dual band radio signal to obtain four sampled signals including a first I component, Iin+, a first Q component, Qin+, a second I component, Iin−, and a second Q component, Qin−. Phases of Qin+, Iin− and Qin− are respectively offset with respect to phases of Iin+, Qin+ and Iin− by π/2. The polyphase filters are configured to filter the four sampled signals to obtain a first set of filtered signals each of which has a same power as the first frequency band component and a second set of filtered signals each of which has a same power as the second frequency band component. The power estimators are configured to estimate a power of the first frequency band component, a power of the second frequency band component and a total power of the first frequency band component and the second frequency band component, based on the four sampled signals, the first set of filtered signals and the second set of filtered signals. The AGC is configured to selectively attenuate the first frequency band component and the second frequency band component based on the estimated powers.

With the method and dual band radio receiver according to the first and the second aspects of the disclosure, a received analog dual band radio signal consisting of a first frequency band component and a second frequency band component can be handled appropriately (even if there is a large difference between powers of the first and the second frequency band components), by estimating the power of the first frequency band component, the power of the second frequency band component and the total power of the first and the second frequency band components based on the outputs of the interleaving ADCs and the polyphase filters and then selectively attenuating the first frequency band component and the second frequency band component based on the estimated powers.

In terms of size, power consumption and cost, the proposed receiver structure is advantageous over the prior art receiver structure as illustrated in FIG. 4, because the interleaving ADCs and polyphase filters required for the proposed receiver structure are typically smaller, less power-consuming and less expensive than the couplers required for the prior art receiver structure.

Additionally, the proposed receiver structure is advantageous over the prior art receiver structure as shown in FIG. 5 in terms of response speed, because no time-consuming digital processing needs to be performed for measuring and filtering the powers of the first and the second frequency band components and the total power of the first and the second frequency band components.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, circuits, and devices are omitted so as not to obscure the description with unnecessary detail.

Figure 6:
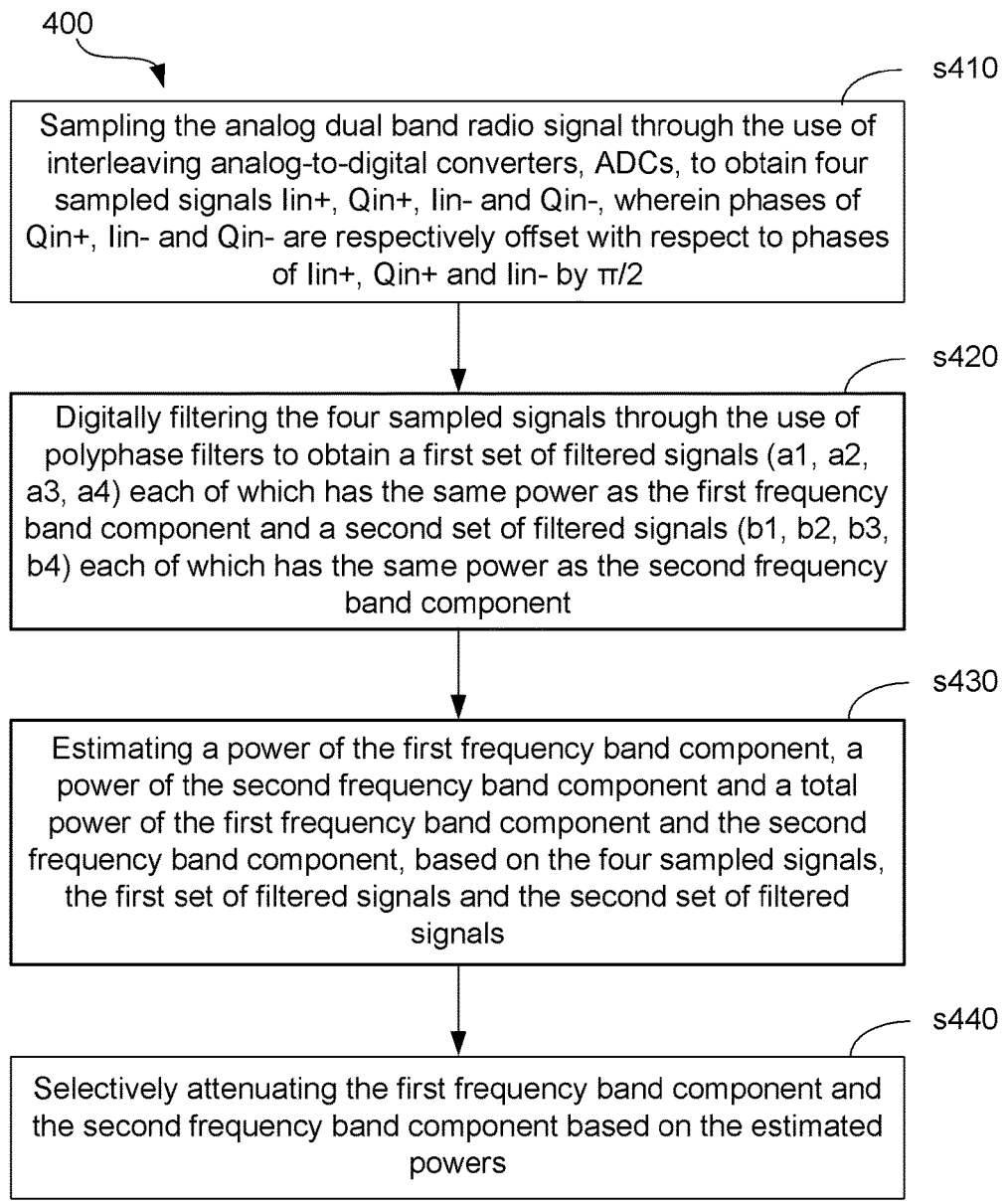
FIG. 6 is a flowchart illustrating a method in a dual band radio receiver for handling an analog dual band radio signal according to the present disclosure according to the present disclosure.

FIG. 6 schematically illustrates a method 400 implemented in a dual band radio receiver for handling an analog dual band radio signal according to the present disclosure.

As illustrated, initially, the analog dual band radio signal which comprises a first frequency band component and a second frequency band component is sampled through the use of interleaving ADCs at block s410, to obtain four sampled signals including a first I component, Iin+, a first Q component, Qin+, a second I component, Iin−, and a second Q component, Qin−. Phases of Qin+, Iin− and Qin− are respectively offset with respect to phases of Iin+, Qin+ and Iin− by $\pi/2$.

Figure 7:
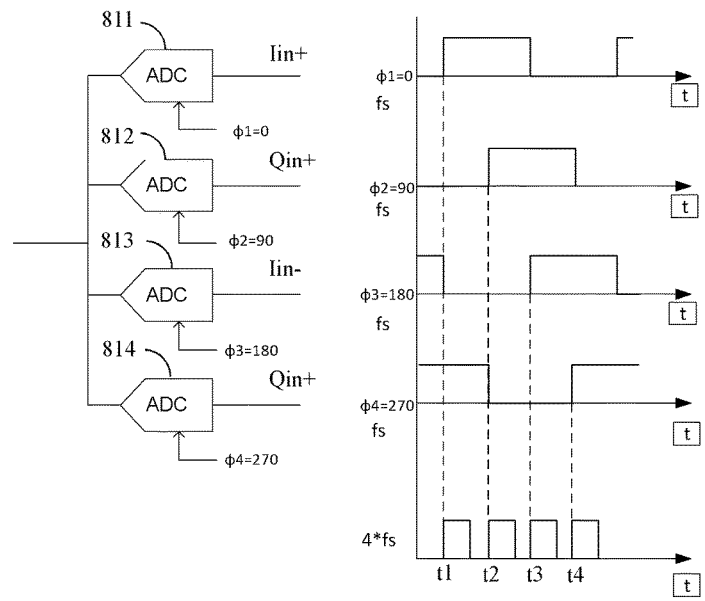
FIG. 7 is a diagram illustrating a structure of interleaving ADCs and timings at which the ADCs sample an analog dual band radio signal.

By way of illustration rather than limitation, an example of the interleaving ADCs is depicted in FIG. 7. As shown, the interleaving ADCs comprise ADCs 811, 812, 813 and 814 which sample the analog dual band radio signal at the same rate (fs) but at different timings, denoted as t1, t2, t3 and t4 respectively. With t2, t3 and t4 being respectively offset with respect to t1, t2, and t3 by $1/(4*fs)$, phases of the sampled signals Qin+, Iin− and Qin− output from ADCs 812-814 are respectively offset with respect to phases of the sampled signals Iin+, Qin+ and Iin− output from ADCs 811-813 by $\pi/2$.

In this manner, the effective sampling rate of the interleaving ADCs as a whole could be as high as $4*f_s$, with $f_s$ denoting the sampling rate of each of the interleaving ADCs. This is advantageous in the sense that an effective sampling rate, which is high enough such that the entire spectrum of the analog dual band radio signal (including the spectrum of the first frequency band component and the spectrum of the second frequency band component) falls within one Nyquist zone, can be achieved by interleaving multiple ADCs each having a relatively low sampling rate. As is well known to those skilled in the art, Nyquist zones are defined as intervals of $F_s/2$ in the frequency domain of the sampled signal, where $F_s$ indicates the effective sampling rate for a signal in question which is no slower than 2B (the Nyquist rate) and B is the highest frequency of the signal in question. For example, the $1^{st}$ one of the Nyquist zones is from 0 to $F_s/2$.

Referring back to FIG. 6, after the four sampled signals Iin+, Qin+, Iin− and Qin− are obtained at block s410, they are filtered through the use of polyphase filters at block s420, to obtain a first set of filtered signals (a1, a2, a3, a4) each of which has a same power as the first frequency band component and a second set of filtered signals (b1, b2, b3, b4) each of which has a same power as the second frequency band component.

Figure 8:
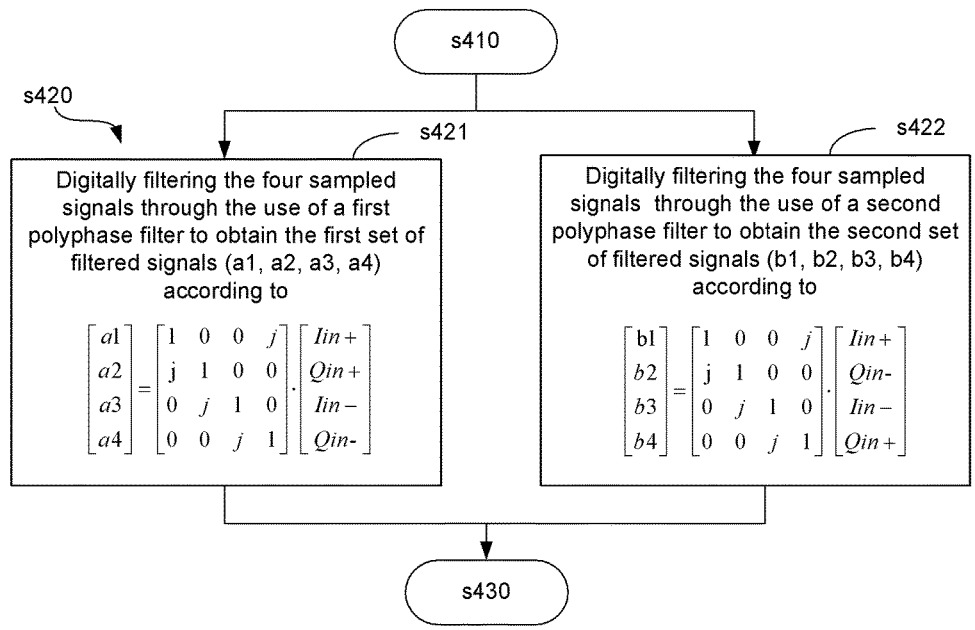
FIG. 8 is a flowchart illustrating operations of a step shown in FIG. 6.

In an embodiment, the operation shown at block s420 in FIG. 6 may comprise operations shown at blocks s421 and s422 in FIG. 8. At block s421, the four sampled signals Iin+, Qin+, Iin− and Qin− are filtered through the use of a first polyphase filter to obtain the first set of filtered signals (a1, a2, a3, a4) according to $$\begin{bmatrix} a1 \\ a2 \\ a3 \\ a4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin+ \\ Iin- \\ Qin- \end{bmatrix}. \quad (1)$$

At block s422, the four sampled signals Iin+, Qin+, Iin− and Qin− are filtered through the use of a second polyphase filter to obtain the second set of filtered signals (b1, b2, b3, b4) according to $$\begin{bmatrix} b1 \\ b2 \\ b3 \\ b4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin- \\ Iin- \\ Qin+ \end{bmatrix}. \quad (2)$$

Figure 9:
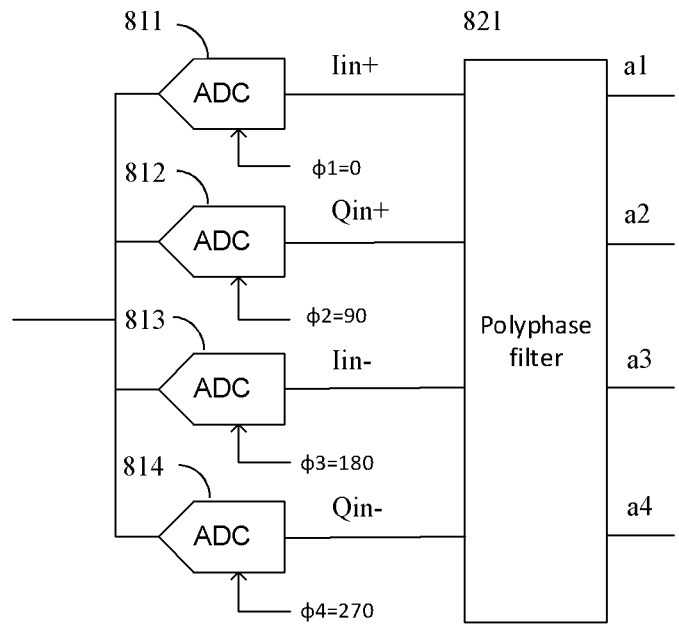
FIG. 9 is a diagram illustrating how to couple output terminals of interleaving ADCs to input terminals of a polyphase filter.
Figure 10:
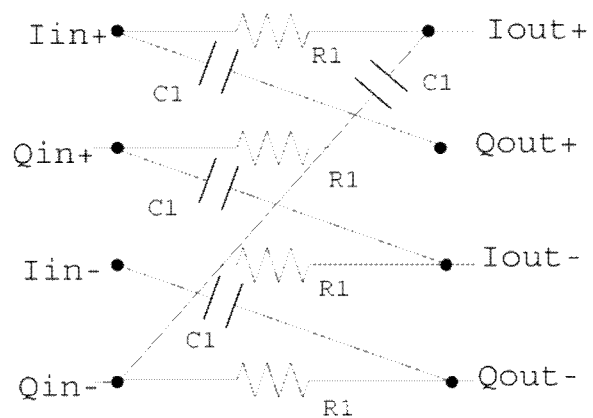
FIG. 10 is a diagram illustrating a polyphase filter implemented as a resistor-capacitor (RC) network.

In practical implementation, the first polyphase filter 821 may receive the outputs of the interleaving ADCs 811-814 at its first to fourth input terminals respectively as illustrated in FIG. 9, and may be implemented in the form of the equivalent circuit model of an RC network as illustrated in FIG. 10. As those skilled in the art will appreciate, the second polyphase filter may receive the outputs of the interleaving ADCs 811, 814, 813 and 812 at its first to fourth input terminals respectively, and may also be implemented as the RC network illustrated in FIG. 10.

In the following, we will prove that each of the first set of filtered signals (a1, a2, a3, a4) obtained according to formula (1) has the same power as the first frequency band component.

Supposing the dual band radio signal comprises two frequency band components at frequency bands a and b, each of the sampled signals Iin+, Qin+, Iin− and Qin− would also comprise two frequency band components at frequency bands a and b. Thus, Iin+ may be split into components Iain+ and Ibin+, Qin+ may be split into components Qain+ and Qbin+, Iin− may be split into Iain− and Ibin−, and Qin− may be split into Qain− and Qbin−.

Considering frequency band a, substituting components Iain+, Qain+, Iain− and Qain− into formula (1) gives $$\frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iain+ \\ Qain+ \\ Iain- \\ Qain- \end{bmatrix} = \frac{1}{2} \cdot \begin{bmatrix} (Iain+) + j(Qain-) \\ j(Iain+) + (Qain+) \\ j(Qain+) + (Iain-) \\ j(Iain-) + (Qain-) \end{bmatrix}. \quad (3)$$

As Qain+ is equal to j(Iain+), the right side of the above equation (3) can be rewritten as $$\frac{1}{2} \cdot \begin{bmatrix} (Iain+) + j(Qain-) \\ j(Iain+) + (Qain+) \\ j(Qain+) + (Iain-) \\ j(Iain-) + (Qain-) \end{bmatrix} = \begin{bmatrix} Iain+ \\ j(Iain+) \\ Iain- \\ j(Iain-) \end{bmatrix}. \quad (4)$$

Iain+, j(Iain+), Iain− and j(Iain−) each have the same power as the first frequency band component of the analog dual band radio signal.

For frequency band b, as the spectrum of the second frequency band component and the spectrum of the first frequency component are located at opposite sides of zero frequency, the following relationships hold true:

$$\begin{cases} Ibin+ = k * Iain+ \\ Qbin+ = k * -Qain+ \end{cases}, k \text{ being a non-zero constant} \quad (5)$$

$$\Rightarrow Qbin+ = -j(Ibin+). \quad (6)$$

Then, substituting components Ibin+, Qbin+, Ibin− and Qbin− into formula (1) gives $$\frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Ibin+ \\ Qbin+ \\ Ibin- \\ Qbin- \end{bmatrix} = \frac{1}{2} \cdot \begin{bmatrix} (Ibin+) + j(Qbin-) \\ j(Ibin+) + (Qbin+) \\ j(Qbin+) + (Ibin-) \\ j(Ibin-) + (Qbin-) \end{bmatrix}. \quad (7)$$

Substituting formula (6) into formula (7), we can further obtain $$\frac{1}{2} \cdot \begin{bmatrix} (Ibin+) + j(Qbin-) \\ j(Ibin+) + (Qbin+) \\ j(Qbin+) + (Ibin-) \\ j(Ibin-) + (Qbin-) \end{bmatrix} = \frac{1}{2} \cdot \begin{bmatrix} (Ibin+) + j(j(Ibin+)) \\ j(Ibin+) - j(Ibin+) \\ j(-j(Ibin+)) + (Ibin-) \\ j(Ibin-) + (j(Ibin+)) \end{bmatrix} = \frac{1}{2} \cdot \begin{bmatrix} 0 \\ 0 \\ 0 \\ 0 \end{bmatrix}. \quad (8)$$

Thus, components Ibin+, Qbin+, Ibin− and Qbin− are filtered out by the first polyphase filter. The first set of filtered signals (a1, a2, a3, a4) output from the first polyphase filter are just Iain+, j(Iain+), Iain− and j(Iain−), each of which has the same power as the first frequency band component of the analog dual band radio signal.

Likewise, it can be proved that each of the second set of filtered signals (b1, b2, b3, b4) obtained according to formula (2) has the same power as the second frequency band component.

Note that formulas (1) and (2) are given here just for illustration rather than limitation. The first and the second polyphase filters may be of any other suitable mathematical form, as long as each of the first/second set of filtered signals output by the first/second polyphase filter has the same power as the first/second frequency band component.

Referring back to FIG. 6, after the first set of filtered signals (a1, a2, a3, a4) and the second set of filtered signals (b1, b2, b3, b4) are obtained at block s420, a power of the first frequency band component, a power of the second frequency band component and a total power of the first frequency band component and the second frequency band component are estimated at block s430, based on the four sampled signals, the first set of filtered signals and the second set of filtered signals.

Figure 11:
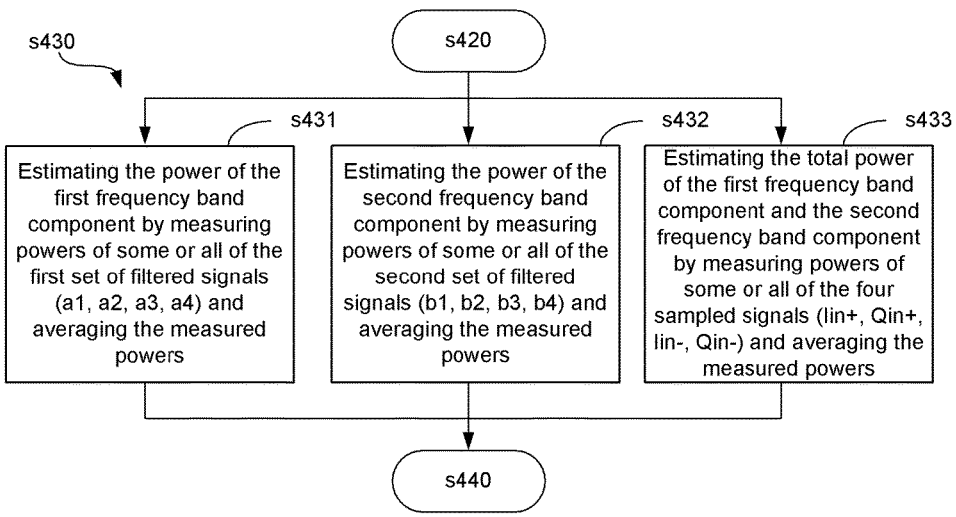
FIG. 11 is a diagram illustrating operations of another step shown in FIG. 6.

In an embodiment, the operation shown at block s430 may comprise operations shown at blocks s431-s433 in FIG. 11. At block s431, the power of the first frequency band component is estimated by measuring powers of some or all of the first set of filtered signals (a1, a2, a3, a4) and averaging the measured powers. At block s432, the power of the second frequency band component is estimated by measuring powers of some or all of the second set of filtered signals (b1, b2, b3, b4) and averaging the measured powers. At block s433, the total power of the first frequency band component and the second frequency band component is estimated by measuring powers of some or all of the four sampled signals and averaging the measured powers.

In practice, respective power meters may be provided for performing the operations at blocks s431-433.

Based on the powers estimated at block s430, the first frequency band component and the second frequency band component are selectively attenuated at block s440, as illustrated in FIG. 6.

Figure 12:
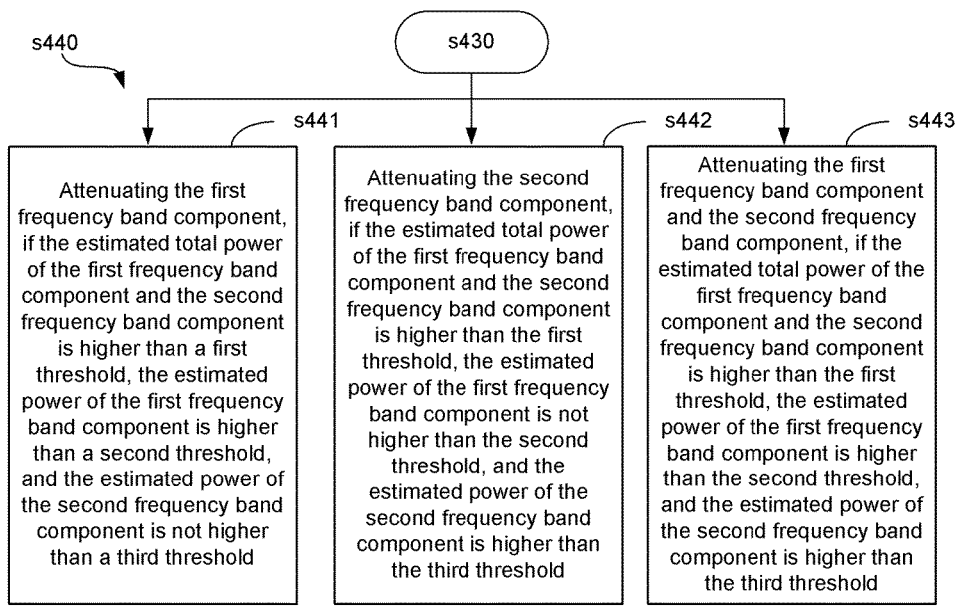
FIG. 12 is a diagram illustrating operations of a further step shown in FIG. 6.

In an embodiment, the operation shown at block s440 may comprise operations shown at blocks s441-s443 in FIG. 12. At block s441, the first frequency band component is attenuated, if the estimated total power of the first frequency band component and the second frequency band component is higher than a first threshold, the estimated power of the first frequency band component is higher than a second threshold, and the estimated power of the second frequency band component is not higher than a third threshold. At block s442, the second frequency band component is attenuated, if the estimated total power of the first frequency band component and the second frequency band component is higher than the first threshold, the estimated power of the first frequency band component is not higher than the second threshold, and the estimated power of the second frequency band component is higher than the third threshold. At block s443, the first frequency band component and the second frequency band component are attenuated, if the estimated total power of the first frequency band component and the second frequency band component is higher than the first threshold, the estimated power of the first frequency band component is higher than the second threshold, and the estimated power of the second frequency band component is higher than the third threshold.

Figure 13:
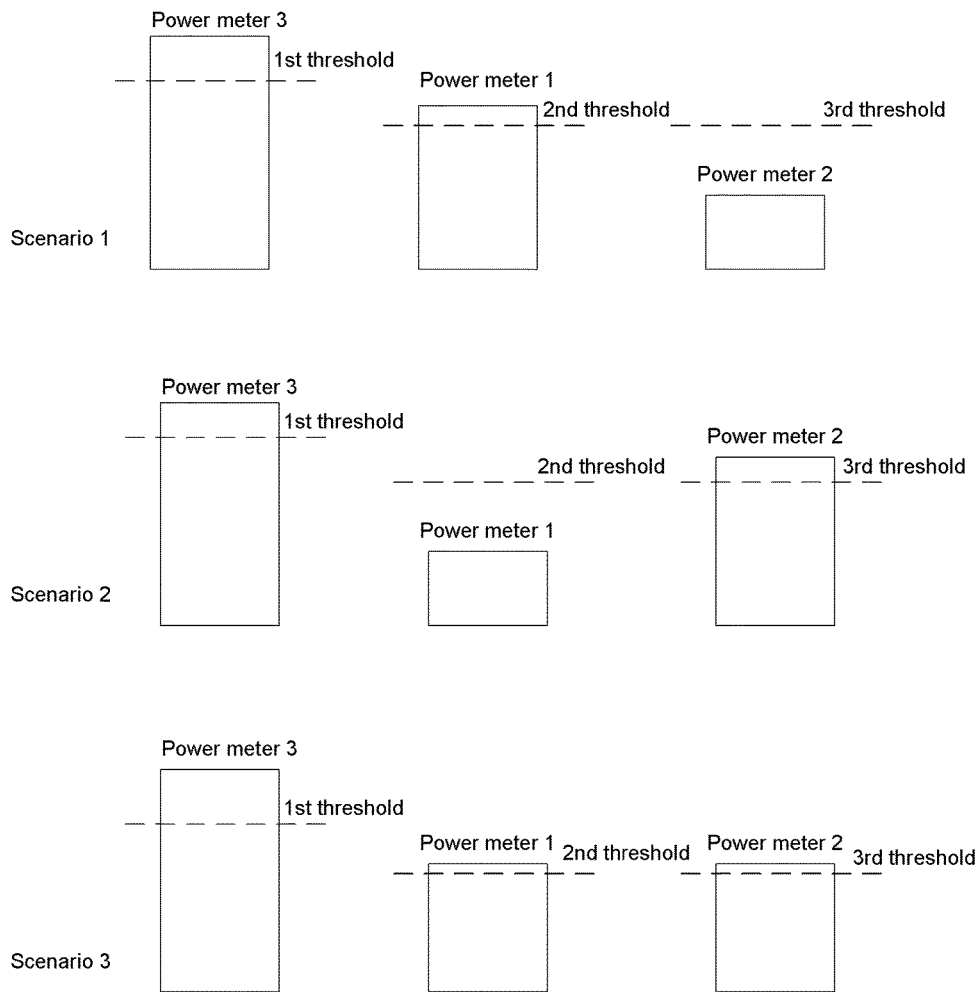
FIG. 13 is a diagram illustrating three scenarios where the operations shown in FIG. 12 shall be performed respectively.

To facilitate understanding, FIG. 13 depicts scenarios 1-3 where the operations at blocks s441-s443 shall be performed respectively. Specifically, in scenario 1, the total power of the first frequency band component and the second frequency band component estimated by a power meter 3 is higher than the first threshold, the power of the first frequency band component estimated by a power meter 1 is higher than the second threshold, and the power of the second frequency band component estimated by a power meter 2 is not higher than a third threshold. In this scenario, only the first frequency band component needs to be attenuated.

In scenario 2, the total power of the first frequency band component and the second frequency band component estimated by the power meter 3 is higher than the first threshold, the power of the first frequency band component estimated by the power meter 1 is not higher than the second threshold, and the power of the second frequency band component estimated by the power meter 2 is higher than the third threshold. In this scenario, only the second frequency band component needs to be attenuated.

In scenario 3, the total power of the first frequency band component and the second frequency band component estimated by the power meter 3 is higher than the first threshold, the power of the first frequency band component estimated by the power meter 1 is higher than the second threshold, and the power of the second frequency band component estimated by the power meter 2 is higher than the third threshold. In this scenario, both the first frequency band component and the second frequency band component need to be attenuated.

Figure 14:
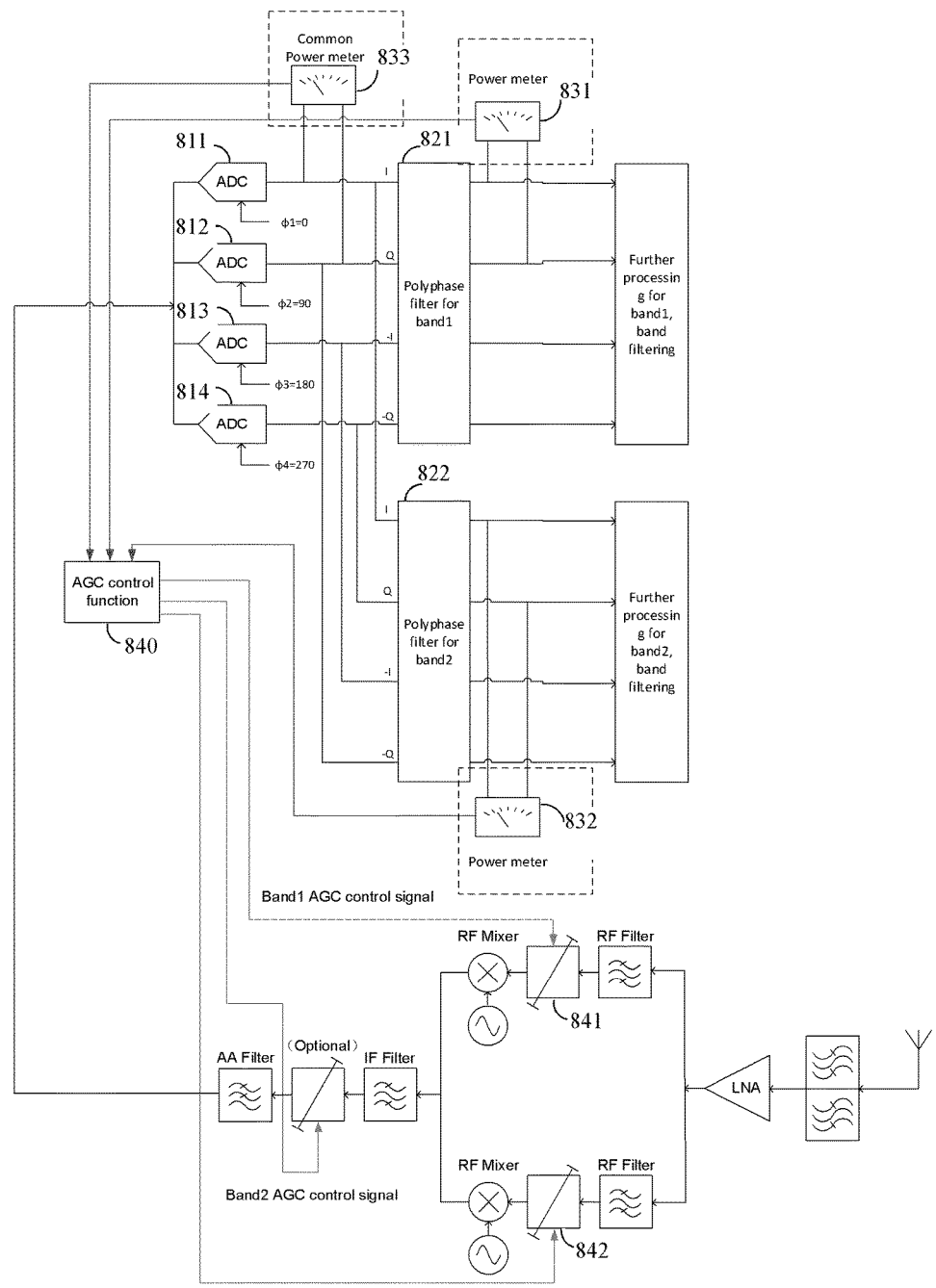
FIG. 14 is a block diagram illustrating an exemplary hardware implementation of a dual band radio receiver according to the present disclosure.

Correspondingly to the above-described method 400, a dual band radio receiver may be provided for handling an analog dual band radio signal comprising a first frequency band component and a second frequency band component. In FIG. 14, a structure of such a dual band radio receiver 800 is presented.

As illustrated, the dual band radio receiver 800 comprises interleaving ADCs 811, 812, 813 and 814, polyphase filters 821 and 822, power estimators 831, 832 and 833, and an AGC 840.

The interleaving ADCs 811, 812, 813 and 814 are configured to sample the analog dual band radio signal t obtain four sample signals including a first I component, Iin+, a first Q component, Qin+, a second I component, Iin−, and a second Q component, Qin−. Phases of Qin+, Iin− and Qin− are respectively offset with respect to phases of Iin+, Qin+ and Iin− by π/2.

The polyphase filters 821 and 822 are configured to filter the four sampled signals to obtain a first set of filtered signals a1, a2, a3 and a4 each of which has a same power as the first frequency band component and a second set of filtered signals b1, b2, b3 and b4 each of which has a same power as the second frequency band component.

The power estimators 831, 832 and 833 are configured to estimate a power of the first frequency band component, a power of the second frequency band component and a total power of the first frequency band component and the second frequency band component, based on the four sampled signals, the first set of filtered signals and the second set of filtered signals.

The AGC 840 is configured to selectively attenuate the first frequency band component and the second frequency band component based on the estimated powers.

In an embodiment, the interleaving ADCs 811, 812, 813 and 814 may be configured to sample the analog dual band radio signal at a same rate, fs, but different timings including a first timing, t1, a second timing, t2, a third timing, t3, and a fourth timing, t4, wherein t2, t3 and t4 are respectively offset with respect to t1, t2, and t3 by 1/(4*fs).

In an embodiment, a first polyphase filter 821 among the polyphase filters 821 and 822 may be configured to filter the four sampled signals Iin+, Qin+, Iin− and Qin− to obtain the first set of filtered signals a1, a2, a3 and a4 according to $$\begin{bmatrix} a1 \\ a2 \\ a3 \\ a4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin+ \\ Iin- \\ Qin- \end{bmatrix}.$$

A second polyphase filter 822 among the polyphase filters 821 and 822 may be configured to filter the four sampled signals Iin+, Qin+, Iin− and Qin− to obtain the second set of filtered signals b1, b2, b3 and b4 according to $$\begin{bmatrix} b1 \\ b2 \\ b3 \\ b4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin- \\ Iin- \\ Qin+ \end{bmatrix}.$$

In an embodiment, a first power estimator 831 among the power estimators 831, 832 and 833 may be configured to estimate the power of the first frequency band component by measuring powers of some or all of the first set of filtered signals a1, a2, a3 and a4 and averaging the measured powers. A second power estimator 832 among the power estimators 831, 832 and 833 may be configured to estimate the power of the second frequency band component by measuring powers of some or all of the second set of filtered signals b1, b2, b3 and b4 and averaging the measured powers. A third power estimator 833 among the power estimators 831, 832 and 833 may be configured to estimate the total power of the first frequency band component and the second frequency band component by measuring powers of some or all of the four sampled signals and averaging the measured powers.

In an embodiment, the AGC 840 may be configured to control a first attenuator 841 to attenuate the first frequency band component, if the estimated total power of the first frequency band component and the second frequency band component is higher than a first threshold, the estimated power of the first frequency band component is higher than a second threshold, and the estimated power of the second frequency band component is not higher than a third threshold. The AGC 840 may be configured to control a second attenuator 841 to attenuate the second frequency band component, if the estimated total power of the first frequency band component and the second frequency band component is higher than the first threshold, the estimated power of the first frequency band component is not higher than the second threshold, and the estimated power of the second frequency band component is higher than the third threshold. The AGC 840 may be configured to control the first attenuator 841 and the second attenuator 842 to attenuate the first frequency band component and the second frequency band component respectively, if the estimated total power of the first frequency band component and the second frequency band component is higher than the first threshold, the estimated power of the first frequency band component is higher than the second threshold, and the estimated power of the second frequency band component is higher than the third threshold.

With the proposed method 400 and dual band radio receiver 800, a received analog dual band radio signal consisting of a first frequency band component and a second frequency band component can be handled appropriately (even if there is a large difference between powers of the first and the second frequency band components), by estimating the power of the first frequency band component, the power of the second frequency band component and the total power of the first and the second frequency band components based on the outputs of the interleaving ADCs and the polyphase filters and then selectively attenuating the first frequency band component and the second frequency band component based on the estimated powers.

Figure 1:
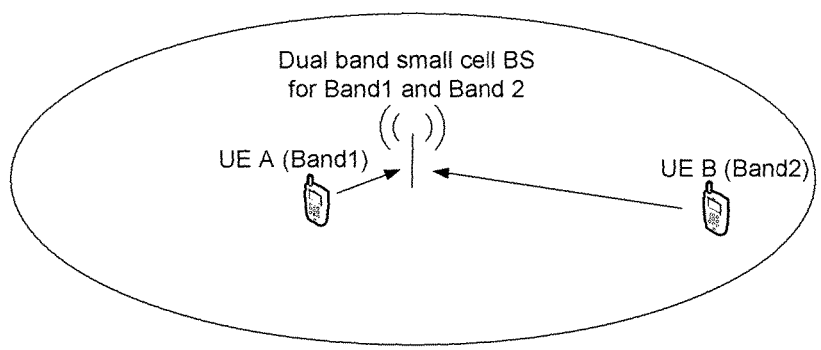
FIG. 1 is a diagram illustrating an exemplary scenario where a BS is provided with a dual band radio receiver for receiving analog dual band radio signals.
Figure 2:
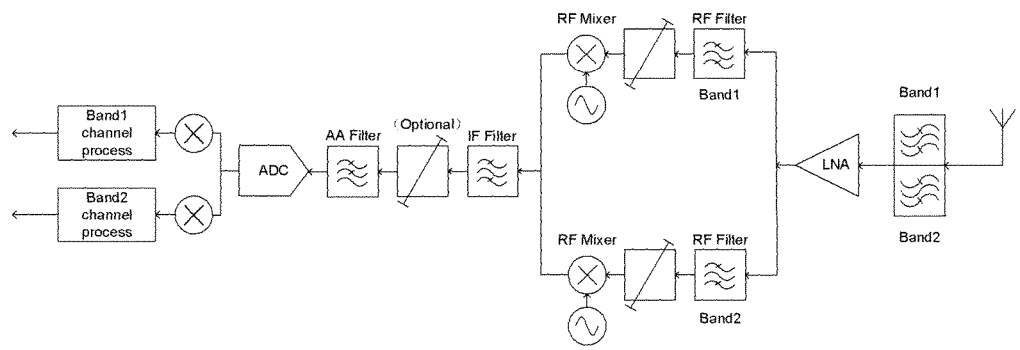
FIG. 2 is a diagram illustrating a typical and popular structure of a simple dual band radio receiver.
Figure 3:
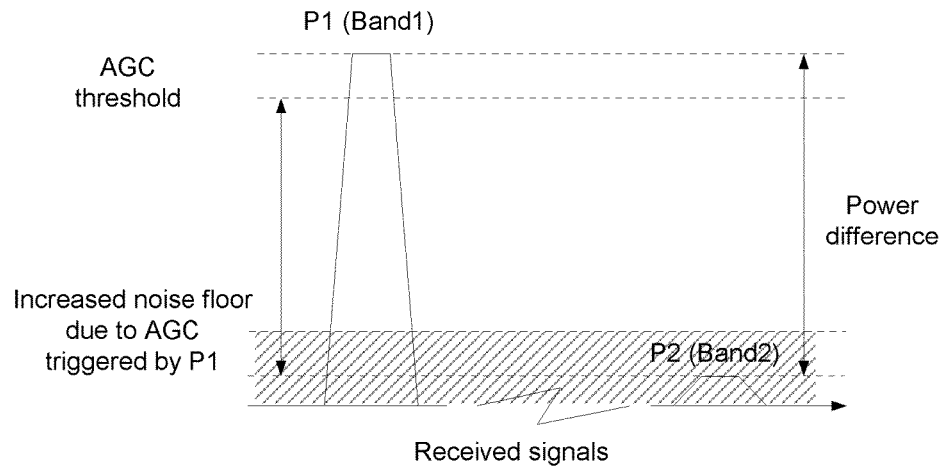
FIG. 3 is a diagram illustrating an exemplary case where a second frequency band component of analog dual band radio signals cannot be identified by an analog dual band radio receiver.
Figure 4:
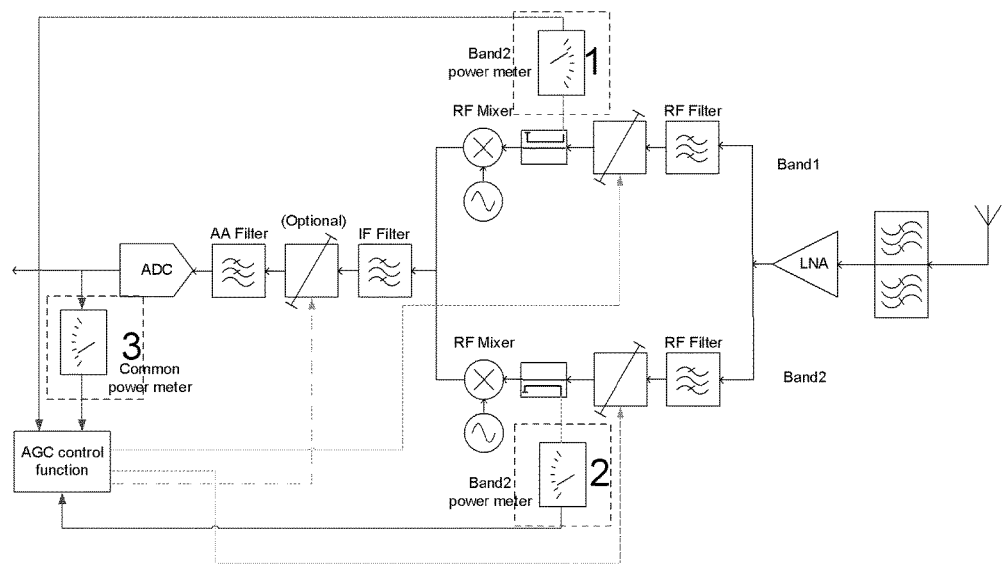
FIG. 4 is a diagram illustrating a structure of a dual band radio receiver with an AGC function according to a first solution in the prior art.

In terms of size, power consumption and cost, the proposed receiver structure is advantageous over the prior art receiver structure as illustrated in FIG. 4, because the interleaving ADCs and polyphase filters required for the proposed receiver structure are typically smaller, less power-consuming and less expensive than the couplers required for the prior art receiver structure.

Figure 5:
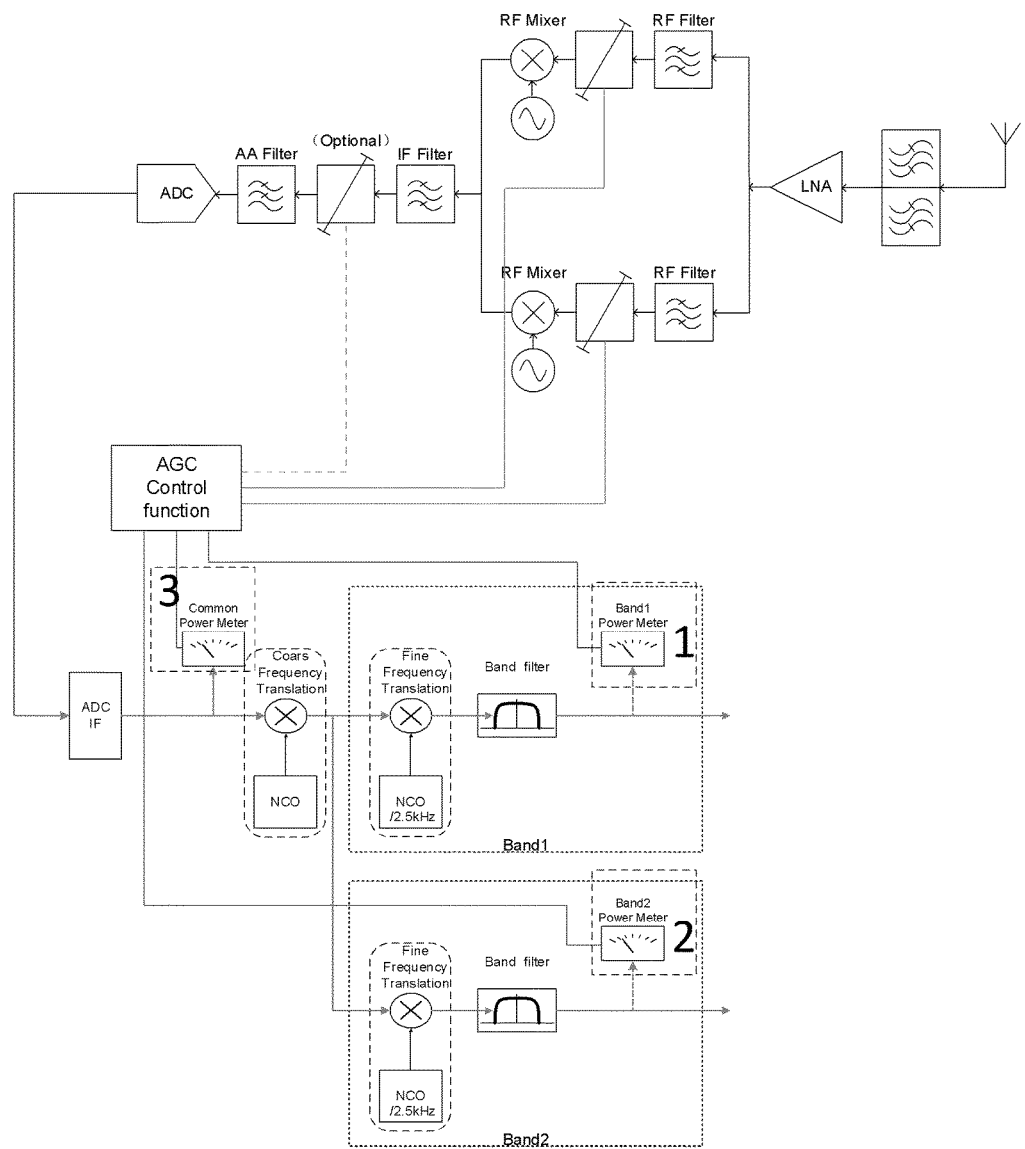
FIG. 5 is a diagram illustrating a structure of another dual band radio receiver with an AGC function according to a second solution in the prior art.

Additionally, the proposed receiver structure is advantageous over the prior art receiver structure as shown in FIG. 5 in terms of response speed, because no time-consuming digital processing needs to be performed for measuring and filtering the powers of the first and the second frequency band components and the total power of the first and the second frequency band components.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method in a dual band radio receiver for handling an analog dual band radio signal comprising a first frequency band component and a second frequency band component, the method comprising the steps of:
   sampling the analog dual band radio signal through the use of interleaving analog-to-digital converters, ADCs, to obtain four sampled signals including a first I component, Iin+, a first Q component, Qin+, a second I component, Iin−, and a second Q component, Qin−, wherein phases of Qin+, Iin− and Qin− are respectively offset with respect to phases of Iin+, Qin+ and Iin− by π/2;

filtering the four sampled signals through the use of polyphase filters to obtain a first set of filtered signals (a1, a2, a3, a4) each of which has a same power as the first frequency band component and a second set of filtered signals (b1, b2, b3, b4) each of which has a same power as the second frequency band component;

estimating a power of the first frequency band component, a power of the second frequency band component and a total power of the first frequency band component and the second frequency band component, based on the four sampled signals, the first set of filtered signals and the second set of filtered signals; and selectively attenuating the first frequency band component and the second frequency band component based on the estimated powers.

2. The method of claim 1, wherein the interleaving ADCs sample the analog dual band radio signal at a same rate (fs) but different timings including a first timing, t1, a second timing, t2, a third timing, t3, and a fourth timing, t4, wherein t2, t3 and t4 are respectively offset with respect to t1, t2, and t3 by $1/(4*fs)$.

3. The method of claim 1, wherein the step of filtering comprises:

filtering the four sampled signals through the use of a first polyphase filter to obtain the first set of filtered signals (a1, a2, a3, a4)

$$\begin{bmatrix} a1 \\ a2 \\ a3 \\ a4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin+ \\ Iin- \\ Qin- \end{bmatrix},$$

and filtering the four sampled signals through the use of a second polyphase filter to obtain the second set of filtered signals (b1, b2, b3, b4) according to $$\begin{bmatrix} b1 \\ b2 \\ b3 \\ b4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin- \\ Iin- \\ Qin+ \end{bmatrix}.$$

4. The method of claim 1, wherein the step of estimating comprises:

estimating the power of the first frequency band component by measuring powers of some or all of the first set of filtered signals (a1, a2, a3, a4) and averaging the measured powers;

estimating the power of the second frequency band component by measuring powers of some or all of the second set of filtered signals (b1, b2, b3, b4) and averaging the measured powers; and estimating the total power of the first frequency band component and the second frequency band component by measuring powers of some or all of the four sampled signals and averaging the measured powers.

5. The method of claim 1, wherein the step of selectively attenuating comprises:

attenuating the first frequency band component, if the estimated total power of the first frequency band component and the second frequency band component is higher than a first threshold, the estimated power of the first frequency band component is higher than a second threshold, and the estimated power of the second frequency band component is not higher than a third threshold, attenuating the second frequency band component, if the estimated total power of the first frequency band component and the second frequency band component is higher than the first threshold, the estimated power of the first frequency band component is not higher than the second threshold, and the estimated power of the second frequency band component is higher than the third threshold, and attenuating the first frequency band component and the second frequency band component, if the estimated total power of the first frequency band component and the second frequency band component is higher than the first threshold, the estimated power of the first frequency band component is higher than the second threshold, and the estimated power of the second frequency band component is higher than the third threshold.

6. A dual band radio receiver for handling an analog dual band radio signal comprising a first frequency band component and a second frequency band component, the receiver comprising:

interleaving analog-to-digital converters, ADCs, configured to sample the analog dual band radio signal to obtain four sampled signals including a first I component, Iin+, a first Q component, Qin+, a second I component, Iin−, and a second Q component, Qin−, wherein phases of Qin+, Iin− and Qin− are respectively offset with respect to phases of Iin+, Qin+ and Iin− by π/2;

polyphase filters configured to filter the four sampled signals to obtain a first set of filtered signals (a1, a2, a3, a4) each of which has a same power as the first frequency band component and a second set of filtered signals (b1, b2, b3, b4) each of which has a same power as the second frequency band component;

power estimators configured to estimate a power of the first frequency band component, a power of the second frequency band component and a total power of the first frequency band component and the second frequency band component, based on the four sampled signals, the first set of filtered signals and the second set of filtered signals; and an automatic gain controller, AGC, configured to selectively attenuate the first frequency band component and the second frequency band component based on the estimated powers.

7. The receiver of claim 6, wherein the interleaving ADCs are configured to sample the analog dual band radio signal at a same rate, fs, but different timings including a first timing, t1, a second timing, t2, a third timing, t3, and a fourth timing, t4, wherein t2, t3 and t4 are respectively offset with respect to t1, t2, and t3 by $1/(4*fs)$.

8. The receiver of claim 6, wherein the polyphase filters comprises:

a first polyphase filter configured to filter the four sampled signals to obtain the first set of filtered signals (a1, a2, a3, a4) according to $$\begin{bmatrix} a1 \\ a2 \\ a3 \\ a4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin+ \\ Iin- \\ Qin- \end{bmatrix},$$

and a second polyphase filter configured to filter the four sampled signals to obtain the second set of filtered signals (b1, b2, b3, b4) according to $$\begin{bmatrix} b1 \\ b2 \\ b3 \\ b4 \end{bmatrix} = \frac{1}{2} \cdot \begin{bmatrix} 1 & 0 & 0 & j \\ j & 1 & 0 & 0 \\ 0 & j & 1 & 0 \\ 0 & 0 & j & 1 \end{bmatrix} \cdot \begin{bmatrix} Iin+ \\ Qin- \\ Iin- \\ Qin+ \end{bmatrix}.$$

9. The receiver of claim 6, wherein the power estimators comprises:
   a first power estimator configured to estimate the power of the first frequency band component by measuring powers of some or all of the first set of filtered signals (a1, a2, a3, a4) and averaging the measured powers;
   a second power estimator configured to estimate the power of the second frequency band component by measuring powers of some or all of the second set of filtered signals (b1, b2, b3, b4) and averaging the measured powers; and
   a third power estimator configured to estimate the total power of the first frequency band component and the second frequency band component by measuring powers of some or all of the four sampled signals and averaging the measured powers.

10. The receiver of claim 6, wherein the automatic gain controller, AGC, is configured to
   control a first attenuator to attenuate the first frequency band component, if the estimated total power of the first frequency band component and the second frequency band component is higher than a first threshold, the estimated power of the first frequency band component is higher than a second threshold, and the estimated power of the second frequency band component is not higher than a third threshold,
   control a second attenuator to attenuate the second frequency band component, if the estimated total power of the first frequency band component and the second frequency band component is higher than the first threshold, the estimated power of the first frequency band component is not higher than the second threshold, and the estimated power of the second frequency band component is higher than the third threshold, and
   control the first attenuator and the second attenuator to attenuate the first frequency band component and the second frequency band component respectively, if the estimated total power of the first frequency band component and the second frequency band component is higher than the first threshold, the estimated power of the first frequency band component is higher than the second threshold, and the estimated power of the second frequency band component is higher than the third threshold.

\* \* \* \* \*